United States Patent
Qiu et al.

(10) Patent No.: US 9,041,934 B2
(45) Date of Patent: May 26, 2015

(54) DISPERSION MANAGED INTERFEROMETRIC FIBER OPTIC GYROSCOPE

(71) Applicant: Honeywell International Inc., Morristown, NJ (US)

(72) Inventors: Tiequn Qiu, Glendale, AZ (US); Steven J. Sanders, Scottsdale, AZ (US); Clarence Eugene Laskoskie, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 41 days.

(21) Appl. No.: 14/063,456

(22) Filed: Oct. 25, 2013

(65) Prior Publication Data
US 2015/0116722 A1    Apr. 30, 2015

(51) Int. Cl.
*G01C 19/72* (2006.01)

(52) U.S. Cl.
CPC ..................... *G01C 19/72* (2013.01)

(58) Field of Classification Search
CPC ........ G01C 19/00; G01C 19/64; G01C 19/72; G01C 19/721; G01C 19/722
USPC .................................. 356/460, 463
See application file for complete search history.

(56) References Cited

U.S. PATENT DOCUMENTS

| | | |
|---|---|---|
| 5,031,988 A | 7/1991 | Okada |
| 5,260,768 A | 11/1993 | Cordova et al. |
| 5,327,213 A | 7/1994 | Blake et al. |
| 5,365,338 A | 11/1994 | Bramson |
| 5,386,290 A | 1/1995 | Okada |
| 5,469,257 A | 11/1995 | Blake et al. |
| 6,040,908 A | 3/2000 | Rahn et al. |
| 6,801,319 B2 | 10/2004 | Szafraniec et al. |
| 6,978,056 B2 | 12/2005 | Tavlykaev |
| 7,180,598 B2 | 2/2007 | Willig et al. |
| 7,317,847 B1 | 1/2008 | Wang et al. |
| 7,844,152 B2 | 11/2010 | Sanders |
| 7,894,073 B2 | 2/2011 | Qiu et al. |
| 2004/0076373 A1 | 4/2004 | Blow et al. |
| 2007/0097374 A1 | 5/2007 | Ren-Young |

FOREIGN PATENT DOCUMENTS

| | | |
|---|---|---|
| EP | 1391693 | 2/2004 |
| EP | 1710935 | 10/2006 |
| JP | 2001290031 | 10/2001 |

OTHER PUBLICATIONS

European Patent Office, "Extended European Search Report from EP Application No. 14186492.6 mailed Mar. 27, 2015", "from Foreign Counterpart of U.S. Appl. No. 14/063,456", Mar. 27, 2015, pp. 17, Published in: EP.

*Primary Examiner* — Jonathan Hansen
(74) *Attorney, Agent, or Firm* — Fogg & Powers LLC (57) ABSTRACT

A dispersion managed interferometric fiber optic gyroscope comprising: a coupler coupled to the broadband light source via a first input fiber; an IOC comprising: a beamsplitter that directs the input signal to a first output and a second output; a combiner configured to combine a first return signal from the first output and a second return signal from the second output into a combined return signal; an integrated optical circuit input coupled to the coupler via a second input fiber; a fiber optic gyroscope sensing coil coupled to a first pigtail fiber and second pigtail fiber, the sensing coil comprising sensing fibers, wherein at least one dispersion slope of at least one of the first input fiber, second input fiber, first pigtail fiber, second pigtail fiber, and the sensing fibers is selected such that the signals at the IOC input has a second order coherence substantially equal to two.

20 Claims, 8 Drawing Sheets

```
┌─────────────────────────────────────┐
│ Creating a sensing coil comprising  │
│ at least one optical fiber having   │
│ at least one dispersion slope       │
│                 601                 │
└─────────────────────────────────────┘
                  │
                  ▼
┌─────────────────────────────────────┐
│ Coupling the sensing coil to an     │
│ integrated optical circuit using    │
│ pigtail fibers                      │
│                 603                 │
└─────────────────────────────────────┘
                  │
                  ▼
┌─────────────────────────────────────┐
│ Coupling integrated optical circuit │
│ to a coupler                        │
│                 605                 │
└─────────────────────────────────────┘
                  │
                  ▼
┌─────────────────────────────────────┐
│ Coupling the coupler to a broadband │
│ light source                        │
│                 607                 │
└─────────────────────────────────────┘
                  │
                  ▼
┌─────────────────────────────────────┐
│ Keeping ideal light source          │
│ statistics by selecting at least    │
│ one fiber dispersion slope          │
│                 609                 │
└─────────────────────────────────────┘
```

DISPERSION MANAGED INTERFEROMETRIC FIBER OPTIC GYROSCOPE

BACKGROUND

Bias stability of depolarized interferometric fiber optic gyroscopes (IFOG) is affected by nonlinear optical effects in the sensing loop of the IFOG. For an ideal broadband light source, no nonlinear optical effects should exist due to the statistical properties of the perfectly thermal source.

When a light source is perfectly thermal, the second order degree of coherence, given by $g_{11}^{(2)}(\tau) = \langle I(t)I(t+\tau) \rangle / \langle I \rangle^2$, is such that $g_{11}^{(2)}(0) = 2$, (hereinafter referred to as "g11"). Here I(t) is the instantaneous light intensity, and $\tau$ is the delay time. The angle bracket represents average over time. Perfect thermal source means: there is no correlation between the many harmonic or wavelength components that make up the light source spectrum.

However, for less than ideal light sources, the light source statistics are not found to be perfectly thermal, leading to bias instability in the IFOG as optical power fluctuates. This instability has been clearly observed in depolarized IFOGs.

SUMMARY

In one embodiment, a dispersion managed interferometric fiber optic gyroscope is provided. The dispersion managed interferometric fiber optic gyroscope comprises a broadband light source configured to provide an input signal. A coupler is coupled to the broadband light source via a first input fiber. The first input fiber is configured to carry the input signal from the broadband light source to the coupler, wherein the coupler has a first coupler output and a second coupler output. A rate detector coupled to the second output via an output fiber. The fiber optic gyroscope also includes an integrated optical circuit. The integrated optical circuit comprises a beamsplitter that directs the input signal to a first output and a second output, and a combiner coupled to the first output and the second output. The combiner is configured to combine a first return signal from the first output and a second return signal from the second output into a combined return signal. An integrated optical circuit input is coupled to the first coupler output via a second input fiber, the second input fiber configured to carry the input signal from first coupler output to the integrated optical circuit input and the combined return signal from the integrated optical circuit input to the coupler. A first pigtail fiber is coupled to the first output. A second pigtail fiber is coupled to the second output. A fiber optic gyroscope sensing coil is coupled to the first pigtail fiber and second pigtail fiber. The fiber optic gyroscope sensing coil comprising one or more sensing fibers, wherein the first pigtail fiber carries the input signal to the fiber optic gyroscope sensing coil and the first return signal from fiber optic gyroscope sensing coil to the first output. The second pigtail fiber carries the input signal to the fiber optic gyroscope sensing coil and the second return signal from fiber optic gyroscope sensing coil to the second output. At least one dispersion slope of at least one of the first input fiber, second input fiber, first pigtail fiber, second pigtail fiber, and the one or more sensing fibers is selected such that at least one of the input signal or combined return signal at the integrated optical circuit input has a second order coherence g11 substantially equal to two.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

To address the non-linear optical effects observed in IFOGs, fibers with offsetting dispersion slopes may be used as described below. Furthermore, it is also possible to use fibers with a dispersion slope that corrects or compensates for a light source's non-ideal characteristics.

Figure 1:
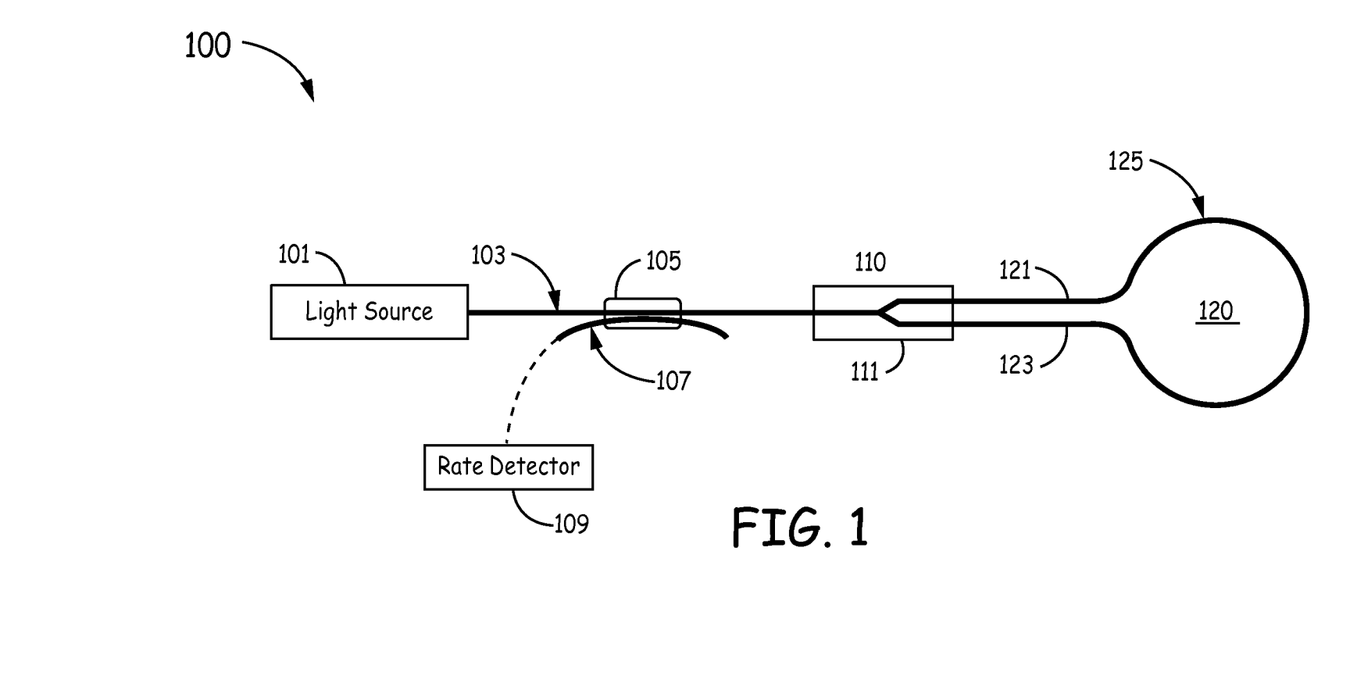
FIG. 1 illustrates one embodiment of a dispersion managed interferometric fiber optic gyroscope.

FIG. 1 illustrates an exemplary optical schematic for a fiber optic gyroscope 100. Fiber optic gyroscope 100 includes broadband light source 101. Broadband light source 101 generates a light signal that is comprised of many waves with different wavelengths and polarization states. A perfectly thermal broadband light source 101 has no correlation between the different harmonic or spectral components that make up the source. Theoretically, a perfectly thermal broadband light source 101 has a second order coherence number, g11, of 2.0. Input fiber 103 couples broadband light source 101 to coupler 105 and the same fiber 103 couples light from coupler 105 to the waveguide of integrated optical circuit (IOC) 110. Coupler 105 includes both input fiber 103 and output fiber 107. Output fiber 107 carries a returned signal from the IOC to a rate detector 109 which reads the signal returning from the sensing fiber 125. IOC 110 includes a beam-splitting/combining element 111, a polarizing element, and two or more electrodes used for phase-modulation of the light beams passing through the IOC 110. In one embodiment, the beam-splitter is a y-branch beam-splitter 111, splitting the signal into two signals. In some embodiments, the polarizing element could be the waveguide of the IOC 110 itself, while in other embodiments the polarizing element could be a separate element along the optical path. The signal from the broadband light source 101 is linearly polarized by passing through the IOC 110. Pigtail fibers 121 and 123 couple the IOC 110 to sensing coil 120. In one embodiment, the signal is depolarized with a depolarizer placed between the sensing coil 120 and the IOC. The depolarizer can be placed on either pigtail fiber 121 and/or 123. Sensing coil 120 comprises a sensing fiber 125 wound in a coil shape.

A fiber with zero dispersion slope is used for the input fiber 103, IOC pigtail fibers 121 and 123, and sensing fiber 125. Dispersion refers to group velocity dispersion. Theoretical analysis shows that for a fiber without a dispersion slope, the broadband light source statistics can be maintained in a perfectly thermal state, which effectively reduces nonlinear optical effects. By using a fiber with a zero dispersion slope, the light source second order coherence, g11, can be kept at 2.0 so that the optical Kerr effects can be substantially reduced. In other words, the light source statistics are preserved at the desired value of 2.0 by using zero dispersion slope optical fibers.

In an alternative embodiment, a fiber with a specific large dispersion slope may be used. Input fiber 103, fiber pigtails 121 and 123, and sensing fiber 125 are fibers with a large dispersion slopes. In such an optical circuit having fibers with large dispersion slopes, the g11 can be maintained at or close to 2. The relationship between second order coherence g11 for broadband light propagating through a fiber and the fiber dispersion slope is illustrated in more detail in FIG. 4.

Figure 2:
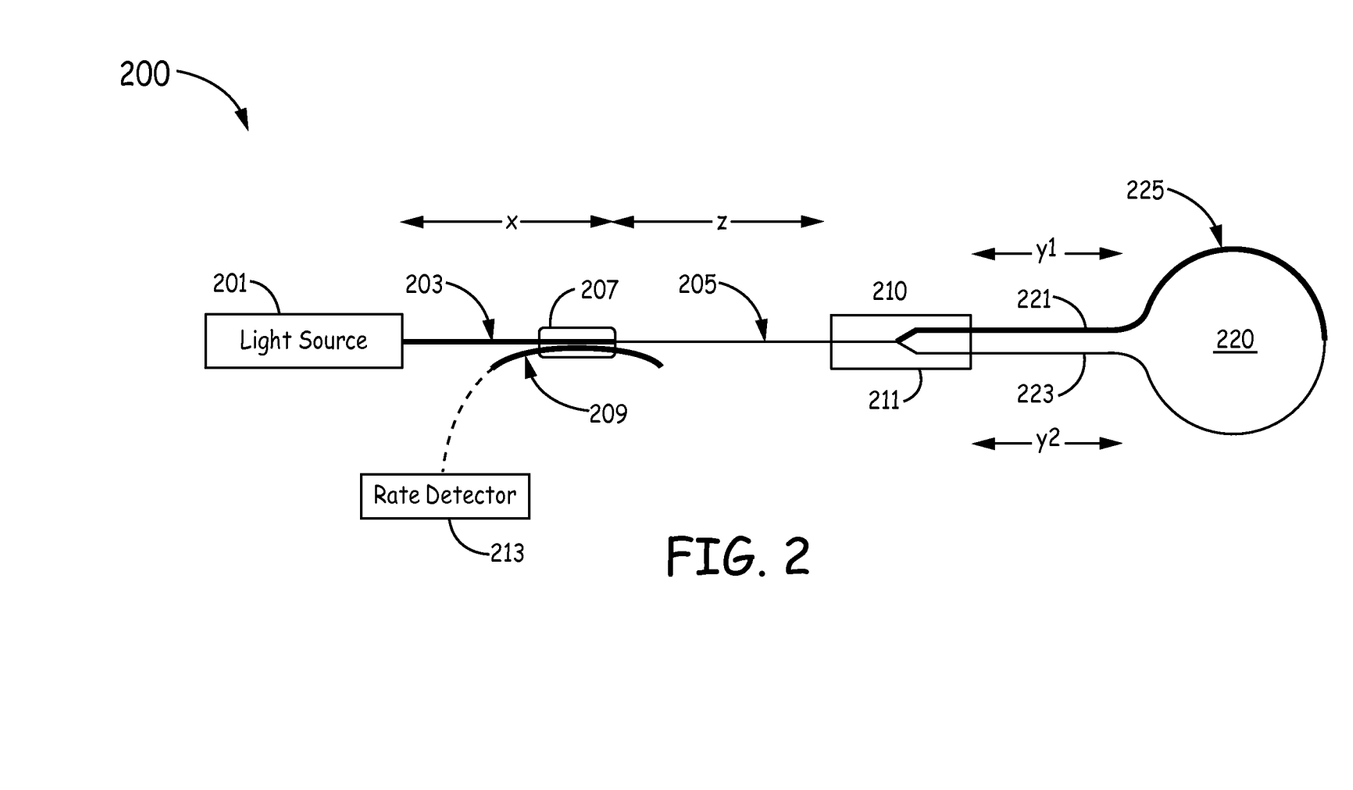
FIG. 2 illustrates an alternative embodiment of a dispersion managed interferometric fiber optic gyroscope.

FIG. 2 illustrates an alternative embodiment of a dispersion managed interferometric fiber optic gyroscope. Fiber optic gyroscope 200 includes broadband light source 201. In one embodiment, light source 201 is a perfectly thermal light source exhibiting ideal light source statistics. In another embodiment, the light source 201 exhibits non-ideal statistics. Input fiber 203 couples broadband light source 201 to coupler 207 over a length x. Input fiber 203 has a positive dispersion slope value a. Fiber 205 couples the signal from coupler to integrated optical circuit 210 over length z. Fiber 205 has a negative dispersion slope of value −b, a dispersion slope opposite of input fiber 203. The fiber lengths are selected so that relation a*x−b*z=0 is satisfied. Coupler 207 includes input fiber 203 and output fiber 209. Output fiber 209 carries a coupled signal returned from the sensing coil 220 to a rate detector 213 which reads the signal. IOC 210 includes a beam-splitting/combining element 211, a polarizing element, and one or more electrodes used for phase-modulation of the light beams passing through the IOC 210. In one embodiment, the beam-splitter is a y-branch beam-splitter 211, splitting the signal into two signals. In some embodiments, the polarizing element could be the waveguide of the IOC 210 itself, while in other embodiments the polarizing element could be a separate element along the optical path. The signal from the broadband light source 201 is linearly polarized by passing through the IOC 210. The sensing loop 220 comprises two types of fibers 221 and 223 that are wound into a sensing coil 220. Fiber 221 is configured to have a length y1 and positive dispersion slope value c. Fiber 223 is configured to have length y2, and a negative dispersion slope with value −d, so that the relation y1*c−y2*d=0 holds for cancellation of total dispersion. In one embodiment, the signal is depolarized with depolarizers placed between the sensing coil 220 and the IOC 210.

Fibers with opposite dispersion slopes are used for input fibers 203/205, and fibers 221/223. In one embodiment, by selecting fibers with opposite dispersion slopes, the total dispersion in the fibers of the system is effectively kept at zero. Thus, broadband light source statistics can be maintained in a nearly perfect thermal state, which effectively reduces any nonlinear optical effects. By utilizing similar dispersion management techniques in other embodiments, the light source second order coherence, g11, can theoretically be kept at 2 so that optical Kerr effects can be substantially reduced. In some embodiments, this may include use of different lengths of fiber with different dispersion slopes, selected such that total system dispersion is kept at 0, where lengths do not have to be matched to be equal. In another embodiment, the light source already exhibits non-ideal characteristics. Fibers are selected with dispersion slopes and lengths, such that the non-ideal characteristics of the light source are corrected for by the IFOG itself.

Figure 3:
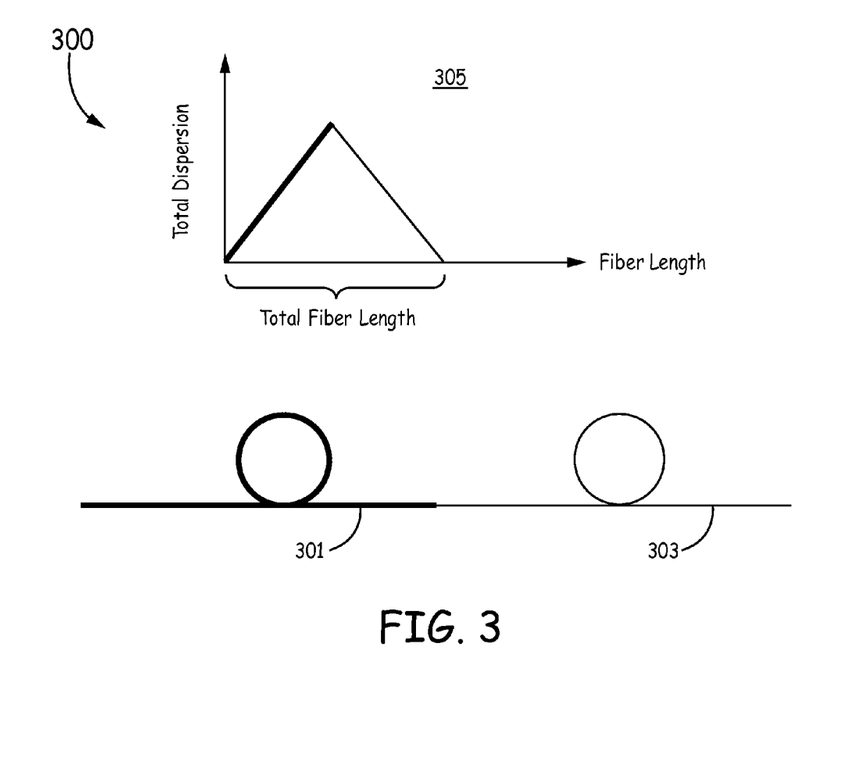
FIG. 3 illustrates a graph showing the relationship of dispersion versus total fiber length using two types of fiber with different dispersion slopes.

FIG. 3 illustrates a graph depicting the total dispersion of a system 300. Using a length of fiber with positive dispersion 301, and an equal length of fiber with negative dispersion 303, with equal and opposite dispersion slopes, the dispersion of the fibers offset one another. Graph 305 illustrates the relationship of total dispersion vs. fiber length.

Figure 4:
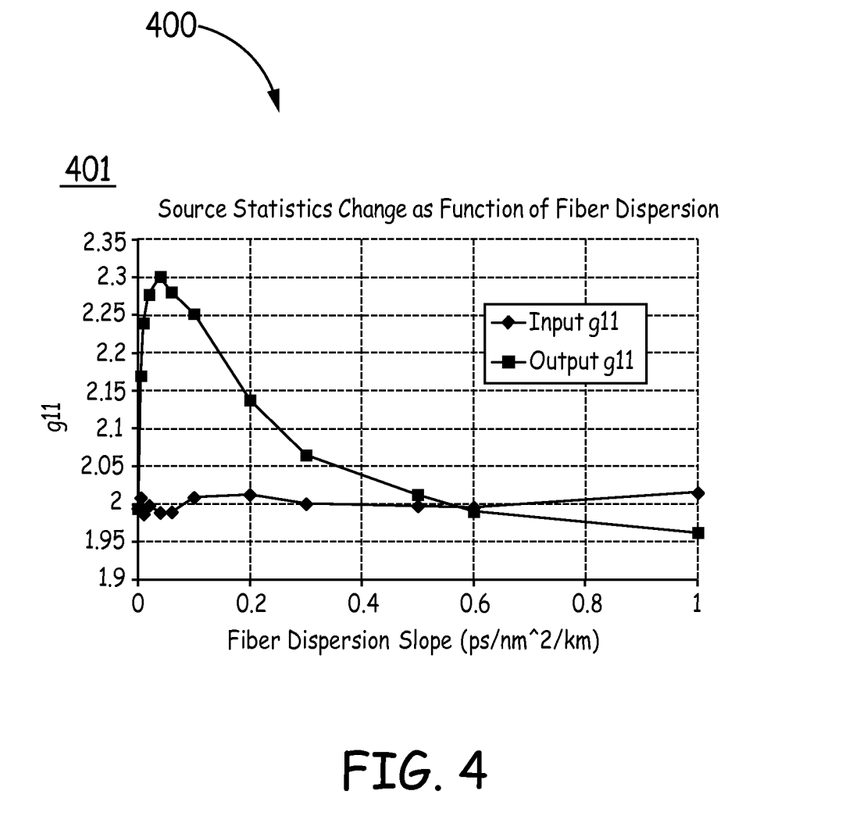
FIG. 4 is a illustrates a graph of second order coherence of light at the input to a fiber and at the output of the fiber, versus fiber dispersion slope.

FIG. 4 illustrates graphs 400 depicting an exemplary relationship between signal characteristics and fiber dispersion slope. Graph 401 illustrates second order coherence g11 of light after propagation through fiber, as a function of fiber dispersion. The corresponding input statistics is also shown. As expected, the light source statistics at the input staying near ideal at g11=2. The fluctuation displayed in g11 is simulation uncertainty/simulation noise. At the output, however, g11 varies significantly at small positive fiber dispersion slopes (>0-0.2). Once the fiber dispersion slopes get sufficiently large (0.6), the output light source statistics again approach those of an ideal thermal source, with g11=2.

Figure 5A:
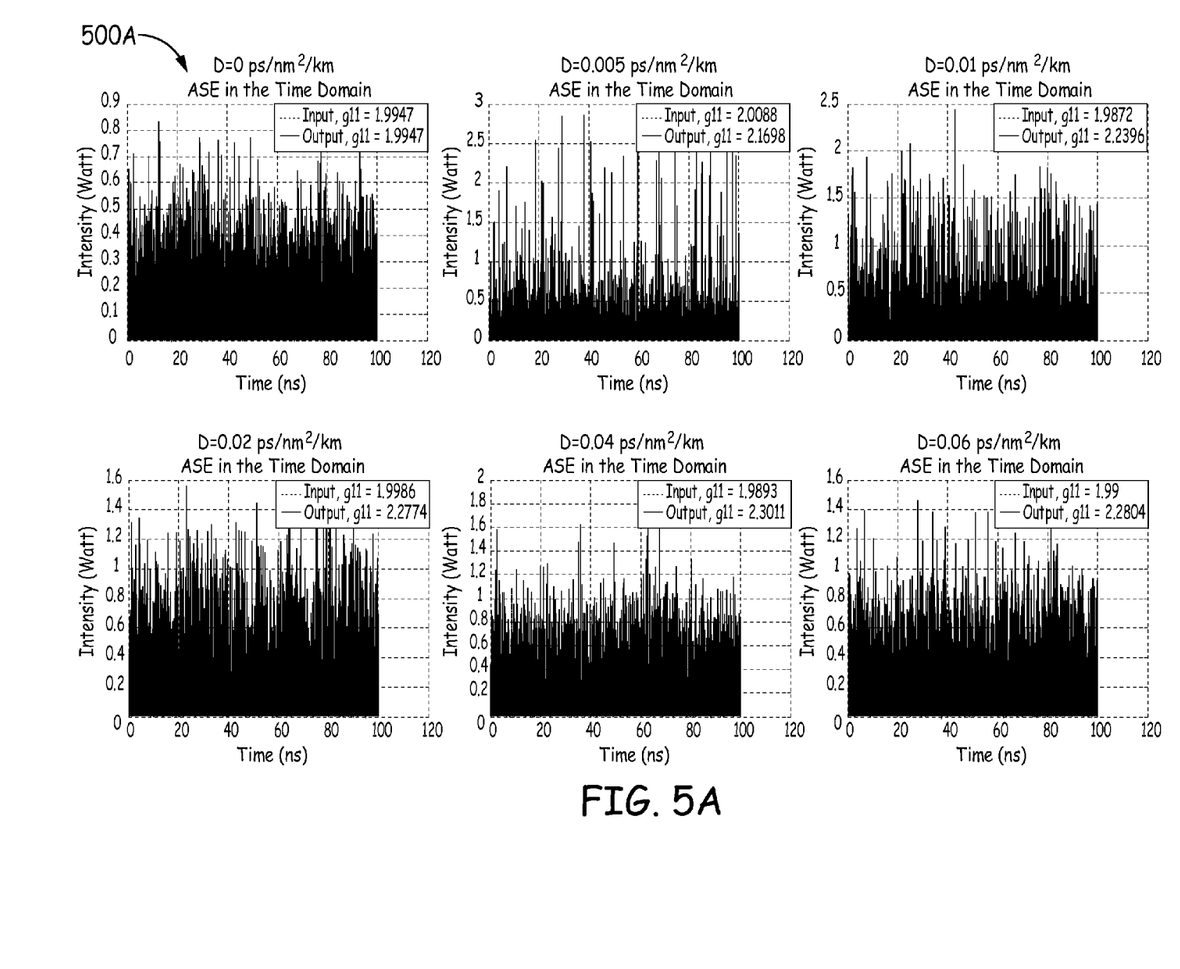
FIGS. 5A and 5B illustrate input and output signals in the time domain for fibers of various dispersion slopes, as well as calculated second order coherence for each of the input and output signals.
Figure 5B:
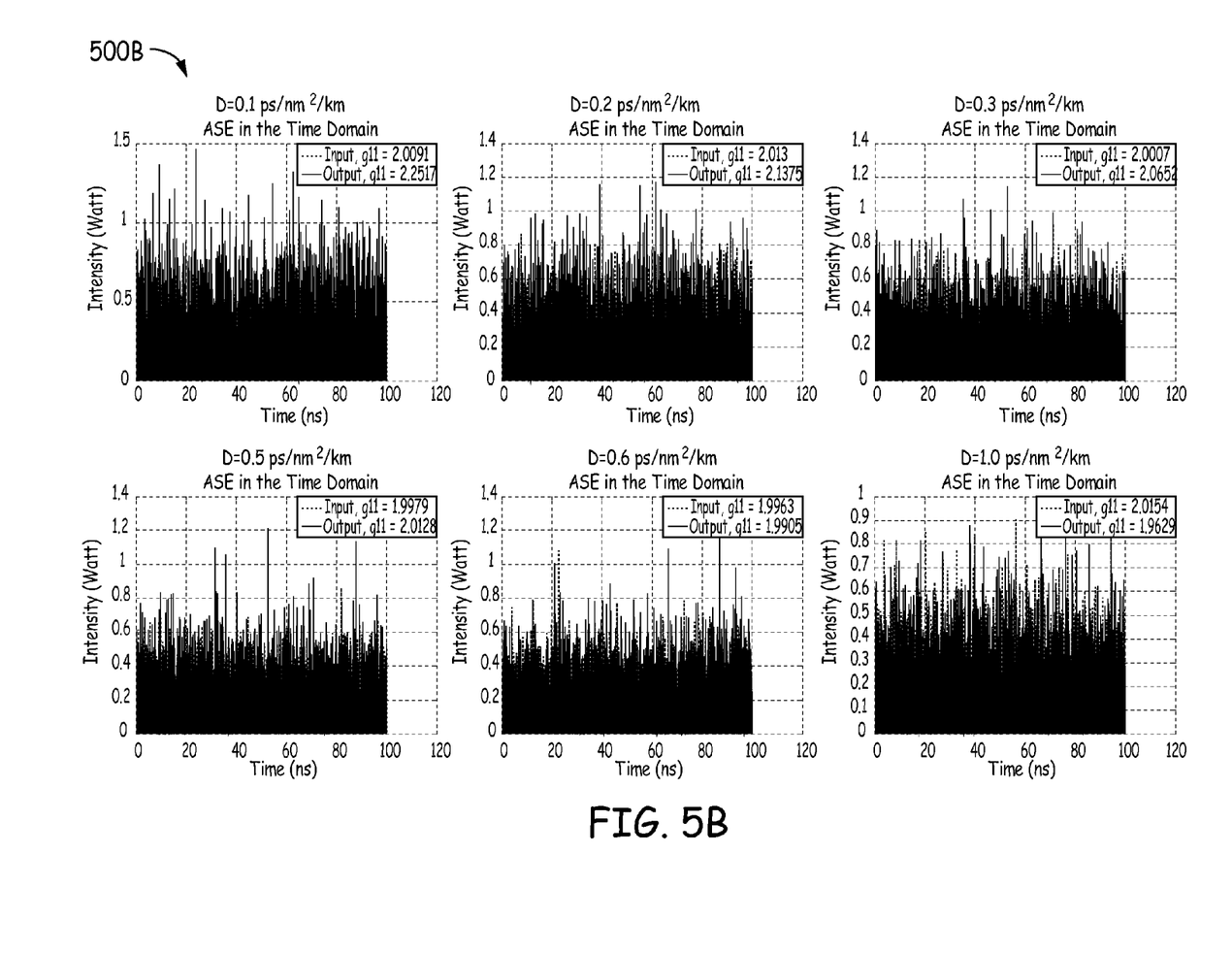

FIGS. 5A and 5B illustrate output time waveform graphs and g11 of a nearly-thermal input optical spectrum after light propagation through 8 km fiber with various dispersion slopes. 500A illustrates graphs for fibers with dispersion slopes D=0, 0.005, 0.01, 0.02, 0.04, and 0.06 ps/nm$^2$/km. 500B illustrates graphs for fibers with dispersion slopes D=0.1, 0.2, 0.3, 0.5, 0.6, and 1.0 ps/nm$^2$/km.

The previously described FIGS. 5A, and 5B illustrate that propagation through a fiber with zero dispersion and zero dispersion slope does not cause the light source statistics g11 to change in propagation through the fiber. Propagation through fibers with a small amount of dispersion slope may cause the source statistics (g11) to deviate substantially from 2.0. However, a large fiber dispersion slope may compensate for imperfect (non-thermal) source statistics and restore the output g11 close to ideal value of 2.0. These findings suggest methods to keep (or restore) source statistics g11 value to 2.0 for Kerr bias cancellation in an IFOG. Such methods can include using a zero dispersion fiber at the wavelength of the amplified spontaneous emission source or otherwise using dispersion management in the sensing coil for Kerr bias cancellation in IFOGs.

Figure 6:
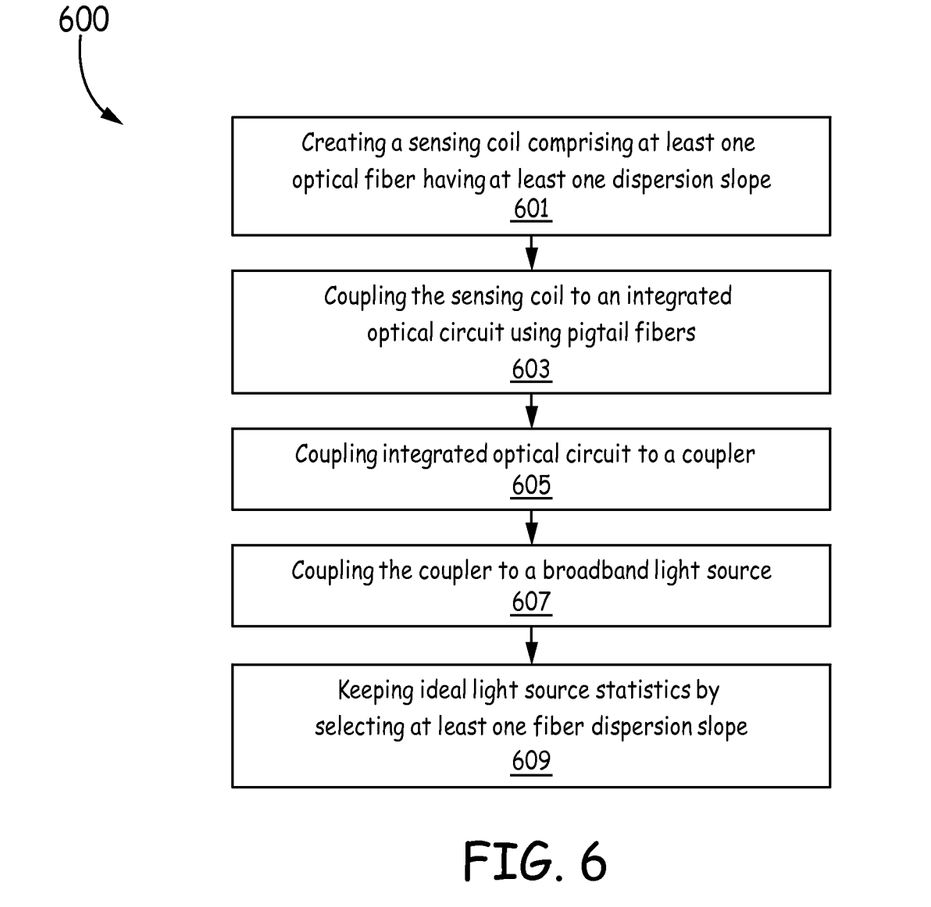
FIG. 6 is a block diagram of an exemplary method for managing dispersion in an interferometric fiber optic gyroscope.

FIG. 6 illustrates a block diagram for a method 600 of managing dispersion in an IFOG. At block 601, a sensing coil is created, comprising at least one optical fiber having at least a dispersion slope that is substantially close to zero. In another embodiment, this may include a splicing of two fibers to create the sensing coil, each fiber having a respective dispersion slope opposite in sign. The lengths of fibers are selected in such a way that the accumulated dispersion is zero. In other embodiments, more than two fibers may be used. At block 603, the sensing coil is coupled to an integrated optical circuit using pigtail fibers 603. In one embodiment, the two pigtail fibers may be used, each pigtail fiber having a respective dispersion slope equal in magnitude, but opposite in sign, such that the respective dispersions slopes of the fibers offset each other. In other embodiments, a single kind of pigtail fiber may be used, the pigtail fibers both having a dispersion slope of zero. At block 605, the integrated optical circuit is coupled to a coupler by a second input fiber. The second input fiber couples to a first output of the coupler. The coupler includes an output fiber, which provides an output signal to a rate detector via an output fiber coupled to a second output of the coupler. The output signal carries the signal from the sensing coil for measurement at the rate detector. At block 607, the coupler is coupled to a broadband light source via a first input fiber. In one embodiment, the broadband light source is a perfectly thermal light source exhibiting ideal light source statistics, g11=2. In other embodiments, the light source may exhibit non-ideal light source statistics. In one embodiment, the first input fiber has a positive dispersion which couples to the coupler. The second input fiber has a negative dispersion, the first input fiber with positive dispersion having equal length to the second input fiber with negative dispersion, both fibers having a dispersion slope equal in magnitude, opposite in sign. In other embodiments, the first and second input fiber can be multiple fibers with offsetting dispersion slopes such that the total length-integrated dispersion of the multiple fibers is zero, or a single fiber with a zero dispersion slope. In other embodiments, the input fiber may be a single fiber having a zero dispersion slope, or more than two fibers. At block 609, light source statistics are kept ideal by selecting at least one dispersion slope of at least one optical fiber of the IFOG. In one embodiment, this is accomplished by using a fiber with a zero dispersion slope. In another embodiment, fibers of equal length, with equal but opposite dispersion slopes may be used to keep total dispersion at zero. In other embodiments, other combinations of fibers with offsetting dispersion slopes and lengths may be used, such that total dispersion in the IFOG is kept at zero. In yet other embodiments, a fiber dispersion slope may be selected to correct for non-ideal light source characteristics.

It is to be understood that FIG. 6 depicts an exemplary embodiment and that it is not necessary to perform the method in the order in which the blocks are presented. Therefore, FIG. 6 and the above description are not to be taken in a limiting sense.

Figure 7:
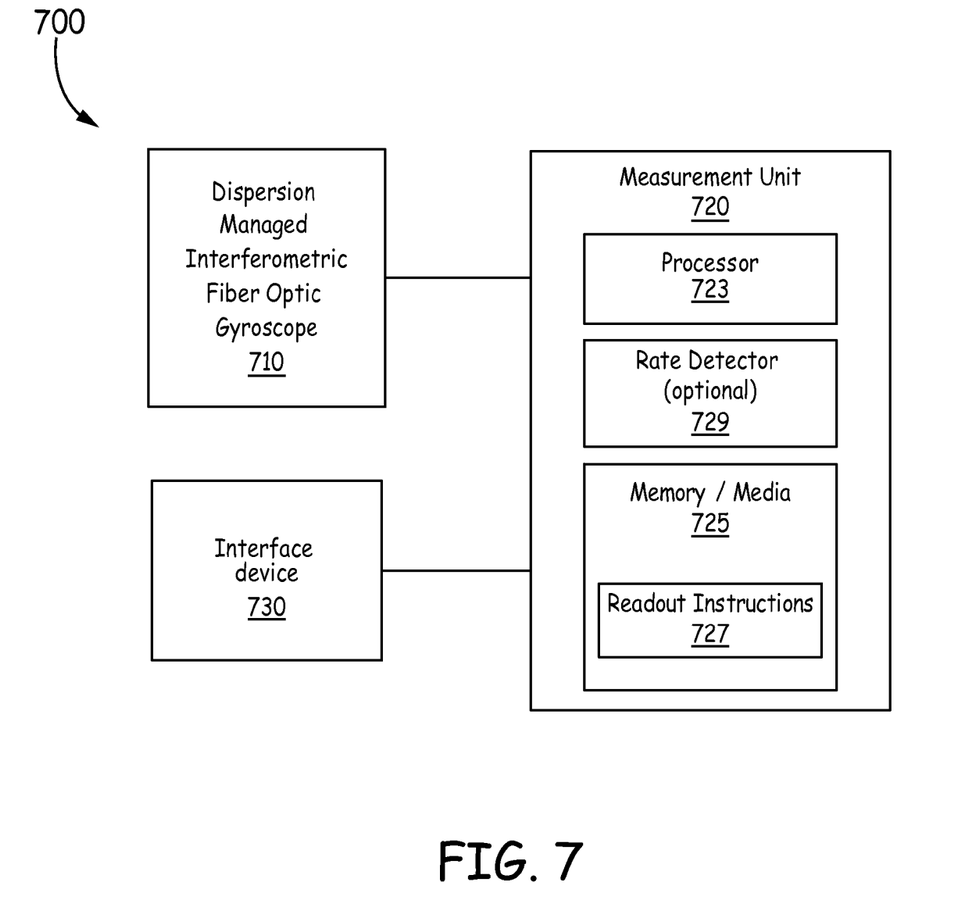
FIG. 7 is a system block diagram illustrating an exemplary dispersion managed interferometric fiber optic gyroscope system.

FIG. 7 is a system block diagram illustrating an exemplary system 700 for a dispersion managed interferometric fiber optic gyroscope 700. In one embodiment, dispersion managed IFOG 710 is coupled to measurement unit 720. Measurement unit 720 comprises a processor 723 coupled to computer readable memory/media 725, containing readout instructions 727. In one embodiment, measurement unit 720 may further include an optional rate detector 729. The processor 723 is coupled to interface device 730. Suitable computer readable memory includes any available media that can be accessed by a general purpose or special purpose computer or processor, or any programmable logic device. For example, suitable processor-readable media may include storage or memory media such as, but not limited to, conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

In one embodiment, the dispersion managed IFOG 710 includes a broadband light source that generates a light signal with second order coherence g11 substantially close to 2.0.

An input fiber couples broadband light source to a coupler, and from the coupler to the waveguide of an integrated optical circuit (IOC). The coupler includes both the input fiber and an output fiber. The output fiber carries a coupled signal from the IOC and sensing loop to a rate detector 729 which reads the signal. The IOC includes a beam-splitting/combining element, a polarizing element, and one or more electrodes used for phase-modulation of the light beams passing through the IOC. In one embodiment, the beam-splitter is a y-branch beam-splitter, splitting the signal into two signals. Pigtail fibers are used to couple the IOC to a sensing coil. The sensing coil comprises a sensing fiber wound in a coil shape. The dispersion slope of the fibers used in the dispersion managed IFOG 710 are chosen to maintain a second order coherence number, g11, close to the desired 2.0. As discussed above, different configurations of the fibers with various dispersion slopes may be used, including, but not limited to, zero dispersion slope fibers, fibers with offsetting opposite dispersion slopes, or fibers with a positive total dispersion.

Measurement unit 720 comprises processor 723 coupled to system memory and/or media 725, which includes readout instructions 727 configured to cause processor 723 to read an IFOG signal from dispersion managed IFOG 710, and calculate a rotational movement of the IFOG 710. In some embodiments, this might be a calculation of the attitude of the IFOG 710, or other calculations made in an inertial reference unit. In one embodiment, the processor reads the signal from the IFOG 710 at an optional rate detector 729. The optional rate detector 729 is configured to read a return signal from the output fiber of the coupler, which carries a returned signal from the sensing coil to the optional rate detector 729 which reads the signal. In one embodiment, the optional rate detector 729 is a photodetector.

Processor 723 is coupled to interface device 730. The processor is configured to cause the interface device 730 to visually, aurally, or otherwise indicate a result indicative of the IFOG signal. In one embodiment, interface device 730 is a display that is capable of displaying graphical content. Suitable exemplary displays include, but are not limited to, a display associated with an aircraft inertial navigation system. Suitable technologies for implementing the display include, but are not limited to, a cathode ray tube (CRT) display, an active matrix liquid crystal display (LCD), a passive matrix LCD, a light emitting diode display (LED), or plasma display unit. In other embodiments, the interface device 730 is a speaker capable of aurally indicating a calculation of the processor, such as the attitude of IFOG 710 or rotational movement of the IFOG 710.

Although specific embodiments have been illustrated and described herein, it will be appreciated by those of ordinary skill in the art that any arrangement, which can achieve the same purpose, may be substituted for the specific embodiments shown. Therefore, it is manifestly intended that this invention be limited only by the claims and the equivalents thereof.

Example Embodiments

Example 1 includes a dispersion managed interferometric fiber optic gyroscope comprising: a broadband light source configured to provide an input signal; a coupler coupled to the broadband light source via a first input fiber, the first input fiber configured to carry the input signal from the broadband light source to the coupler, wherein the coupler has a first coupler output and a second coupler output; a rate detector coupled to the second coupler output via an output fiber; an integrated optical circuit comprising: a beamsplitter that directs the input signal to a first output and a second output; a combiner coupled to the first output and the second output, the combiner configured to combine a first return signal from the first output and a second return signal from the second output into a combined return signal; an integrated optical circuit input coupled to the first coupler output via a second input fiber, the second input fiber configured to carry the input signal from first coupler output to the integrated optical circuit input and the combined return signal from the integrated optical circuit input to the coupler; a first pigtail fiber coupled to the first output; a second pigtail fiber coupled to the second output; a fiber optic gyroscope sensing coil coupled to the first pigtail fiber and second pigtail fiber, the fiber optic gyroscope sensing coil comprising one or more sensing fibers, wherein the first pigtail fiber carries the input signal to the fiber optic gyroscope sensing coil and the first return signal from fiber optic gyroscope sensing coil to the first output, wherein the second pigtail fiber carries the input signal to the fiber optic gyroscope sensing coil and the second return signal from fiber optic gyroscope sensing coil to the second output; wherein at least one dispersion slope of at least one of the first input fiber, second input fiber, first pigtail fiber, second pigtail fiber, and the one or more sensing fibers is selected such that at least one of the input signal or combined return signal at the integrated optical circuit input has a second order coherence g11 substantially equal to two.

Example 2 includes the fiber optic gyroscope of example 1, wherein the first input fiber, second input fiber, first pigtail fiber, second pigtail fiber, and the one or more sensing fibers have zero dispersion slope.

Example 3 includes the fiber optic gyroscope of example 1, wherein the first input fiber and second input fiber are equal in length with a respective dispersion slope equal in magnitude, but opposite in sign.

Example 4 includes the fiber optic gyroscope of any of examples 1-3, wherein the first pigtail fiber and second pigtail are equal in length with a respective dispersion equal in magnitude but opposite in sign.

Example 5 includes the fiber optic gyroscope of any of examples 1-4, wherein the sensing coil comprises a first sensing fiber and a second sensing fiber, wherein the first sensing fiber and second sensing fiber are equal in length, with a respective dispersion equal in magnitude, but opposite in sign.

Example 6 includes the fiber optic gyroscope of any of examples 1-5, wherein total dispersion is zero, wherein total dispersion is a sum of each product of a respective dispersion slope and respective fiber length of the first input fiber, second input fiber, first pigtail fiber, second pigtail fiber, and the one or more sensing fibers.

Example 7 includes the fiber optic gyroscope of any of examples 1-5, wherein total dispersion is greater than 0, wherein total dispersion is a sum of each product of a respective dispersion slope and respective fiber length of the first input fiber, second input fiber, first pigtail fiber, second pigtail fiber, and the one or more sensing fibers.

Example 8 includes the fiber optic gyroscope of any of examples 1-5 and 7, wherein the broadband light source exhibits non-ideal light source statistics, wherein at least one of the first input fiber, second input fiber, first pigtail fiber, second pigtail fiber, or one or more sensing fibers adjusts for the non-ideal light source statistics.

Example 9 includes the fiber optic gyroscope of any of examples 1-8, wherein the beamsplitter and the combiner are a single component.

Example 10 includes a method for managing dispersion in an interferometric fiber optic gyroscope comprising: receiving an input signal having a second order coherence g11 at a first input fiber, wherein the input signal is generated by a broadband light source; transmitting the input signal on the first input fiber to a coupler having a first output and a second output, a second input fiber coupled to the second output and an output fiber coupled to the first output; transmitting the input signal on the second input fiber to an integrated optical circuit input of an integrated optical circuit, wherein the integrated optical circuit has a beamsplitter and a combiner; splitting the input signal to a first output signal and a second output signal; transmitting the first output signal on a first pigtail fiber to a sensing coil, wherein the sensing coil has one or more sensing fibers; transmitting the second output signal on a second pigtail fiber to the sensing coil; receiving a first and second return signal from the sensing coil; transmitting the first returns signal on the first pigtail fiber; transmitting the second return signal on the second pigtail fiber; combining the first return signal and second return signal into a combined return signal; transmitting the combined return signal to the to the coupler on the second input fiber; selecting at least one dispersion slope of at least one of the first input fiber, second input fiber, first pigtail fiber, second pigtail fiber, and the one or more sensing fibers such that at least one of the input signal or combined return signal at the integrated optical circuit input has a second order coherence g11 substantially equal to two.

Example 11 includes the method of example 10, comprising selecting a zero dispersion slope for the first input fiber, second input fiber, first pigtail fiber, second pigtail fiber, and one or more sensing fibers.

Example 12 includes the method of example 10, wherein the first input fiber and second input fiber are equal in length with a respective dispersion slope equal in magnitude, but opposite in sign.

Example 13 includes the method of any of examples 10-12, wherein the first pigtail fiber and second pigtail are equal in length with a respective dispersion equal in magnitude but opposite in sign.

Example 14 includes the method of any of examples 10-13, wherein the sensing coil comprises a first sensing fiber and a second sensing fiber, wherein the first sensing fiber and second sensing fiber are equal in length, with a respective dispersion equal in magnitude, but opposite in sign.

Example 15 includes the method of any of examples 10-14, wherein the broadband light source exhibits second order coherence such that g11 is substantially equal to two.

Example 16 includes the method of any of examples 10-14, wherein the broadband light source exhibits non-ideal light source statistics, wherein at least one of the first input fiber, second input fiber, first pigtail fiber, second pigtail fiber, or one or more sensing fibers adjusts for the non-ideal light source statistics.

Example 17 includes a system for a dispersion managed interferometric fiber optic gyroscope comprising: a broadband light source configured to provide an input signal; a coupler coupled to the broadband light source via a first input fiber, the first input fiber configured to carry the input signal from the broadband light source to the coupler, wherein the coupler has a first coupler output and a second coupler output; a rate detector coupled to the second output via an output fiber, the output fiber configured to carry a coupled signal from the second coupler output to the rate detector; an integrated optical circuit comprising: a beamsplitter that directs the input signal to a first output and a second output; a combiner coupled to the first output and the second output, the combiner configured to combine a first return signal from the first output and a second return signal from the second output into a combined return signal; an integrated optical circuit input coupled to the first coupler output via a second input fiber, the second input fiber configured to carry the input signal from first coupler output to the integrated optical circuit input and the combined return signal from the integrated optical circuit input to the coupler; a first pigtail fiber coupled to the first output; a second pigtail fiber coupled to the second output; a fiber optic gyroscope sensing coil coupled to the first pigtail fiber and second pigtail fiber, the fiber optic gyroscope sensing coil comprising one or more sensing fibers, wherein the first pigtail fiber carries the input signal to the fiber optic gyroscope sensing coil and the first return signal from fiber optic gyroscope sensing coil to the first output, wherein the second pigtail fiber carries the input signal to the fiber optic gyroscope sensing coil and the second return signal from fiber optic gyroscope sensing coil to the second output; wherein at least one dispersion slope of at least one of the first input fiber, second input fiber, first pigtail fiber, second pigtail fiber, and the one or more sensing fibers is selected such that at least one of the input signal or combined return signal at the integrated optical circuit input has a second order coherence g11 substantially equal to two; a measurement unit coupled to the dispersion managed interferometric fiber optic gyroscope, the measurement unit configured to read a signal from the rate detector indicative of rotational movement based on the coupled signal; and an interface device coupled to the measurement unit configured to indicate a result indicative of the rotational movement of the interferometric fiber optic gyroscope.

Example 18 includes the system of example 17, wherein the first input fiber, second input fiber, first pigtail fiber, second pigtail fiber, and the one or more sensing fibers have zero dispersion slope.

Example 19 includes the system of example 17, wherein the first input fiber and second input fiber are equal in length with a respective dispersion slope equal in magnitude, but opposite in sign, wherein the first pigtail fiber and second pigtail are equal in length with a respective dispersion equal in magnitude but opposite in sign.

Example 20 includes the system of any of examples 17-19, wherein the total dispersion is zero, wherein total dispersion is a sum of each product of a respective dispersion slope and respective fiber length of the first input fiber, second input fiber, first pigtail fiber, second pigtail fiber, and one or more sensing fibers.

What is claimed is:

1. A dispersion managed interferometric fiber optic gyroscope comprising:
    a broadband light source configured to provide an input signal;
    a coupler coupled to the broadband light source via a first input fiber, the first input fiber configured to carry the input signal from the broadband light source to the coupler, wherein the coupler has a first coupler output and a second coupler output;
    a rate detector coupled to the second coupler output via an output fiber;
    an integrated optical circuit comprising:
        a beamsplitter that directs the input signal to a first output and a second output;
        a combiner coupled to the first output and the second output, the combiner configured to combine a first return signal from the first output and a second return signal from the second output into a combined return signal;
        an integrated optical circuit input coupled to the first coupler output via a second input fiber, the second input fiber configured to carry the input signal from first coupler output to the integrated optical circuit input and the combined return signal from the integrated optical circuit input to the coupler;
    a first pigtail fiber coupled to the first output;
    a second pigtail fiber coupled to the second output;
    a fiber optic gyroscope sensing coil coupled to the first pigtail fiber and second pigtail fiber, the fiber optic gyroscope sensing coil comprising one or more sensing fibers, wherein the first pigtail fiber carries the input signal to the fiber optic gyroscope sensing coil and the first return signal from fiber optic gyroscope sensing coil to the first output, wherein the second pigtail fiber carries the input signal to the fiber optic gyroscope sensing coil and the second return signal from fiber optic gyroscope sensing coil to the second output;
    wherein at least one dispersion slope of at least one of the first input fiber, second input fiber, first pigtail fiber, second pigtail fiber, and the one or more sensing fibers is selected such that at least one of the input signal or combined return signal at the integrated optical circuit input has a second order coherence g11 substantially equal to two.

2. The fiber optic gyroscope of claim 1, wherein the first input fiber, second input fiber, first pigtail fiber, second pigtail fiber, and the one or more sensing fibers have zero dispersion slope.

3. The fiber optic gyroscope of claim 1, wherein the first input fiber and second input fiber are equal in length with a respective dispersion slope equal in magnitude, but opposite in sign.

4. The fiber optic gyroscope of claim 1, wherein the first pigtail fiber and second pigtail are equal in length with a respective dispersion equal in magnitude but opposite in sign.

5. The fiber optic gyroscope of claim 1, wherein the sensing coil comprises a first sensing fiber and a second sensing fiber, wherein the first sensing fiber and second sensing fiber are equal in length, with a respective dispersion equal in magnitude, but opposite in sign.

6. The fiber optic gyroscope of claim 1, wherein total dispersion is zero, wherein total dispersion is a sum of each product of a respective dispersion slope and respective fiber length of the first input fiber, second input fiber, first pigtail fiber, second pigtail fiber, and the one or more sensing fibers.

7. The fiber optic gyroscope of claim 1, wherein total dispersion is greater than 0, wherein total dispersion is a sum of each product of a respective dispersion slope and respective fiber length of the first input fiber, second input fiber, first pigtail fiber, second pigtail fiber, and the one or more sensing fibers.

8. The fiber optic gyroscope of claim 1, wherein the broadband light source exhibits non-ideal light source statistics, wherein at least one of the first input fiber, second input fiber, first pigtail fiber, second pigtail fiber, or one or more sensing fibers adjusts for the non-ideal light source statistics.

9. The fiber optic gyroscope of claim 1, wherein the beamsplitter and the combiner are a single component.

10. A method for managing dispersion in an interferometric fiber optic gyroscope comprising:
    receiving an input signal having a second order coherence g11 at a first input fiber, wherein the input signal is generated by a broadband light source;
    transmitting the input signal on the first input fiber to a coupler having a first output and a second output, a second input fiber coupled to the second output and an output fiber coupled to the first output;

transmitting the input signal on the second input fiber to an integrated optical circuit input of an integrated optical circuit, wherein the integrated optical circuit has a beamsplitter and a combiner;

splitting the input signal to a first output signal and a second output signal;

transmitting the first output signal on a first pigtail fiber to a sensing coil, wherein the sensing coil has one or more sensing fibers;

transmitting the second output signal on a second pigtail fiber to the sensing coil;

receiving a first and second return signal from the sensing coil;

transmitting the first returns signal on the first pigtail fiber;

transmitting the second return signal on the second pigtail fiber;

combining the first return signal and second return signal into a combined return signal;

transmitting the combined return signal to the to the coupler on the second input fiber;

selecting at least one dispersion slope of at least one of the first input fiber, second input fiber, first pigtail fiber, second pigtail fiber, and the one or more sensing fibers such that at least one of the input signal or combined return signal at the integrated optical circuit input has a second order coherence g11 substantially equal to two.

11. The method of claim 10, comprising selecting a zero dispersion slope for the first input fiber, second input fiber, first pigtail fiber, second pigtail fiber, and one or more sensing fibers.

12. The method of claim 10, wherein the first input fiber and second input fiber are equal in length with a respective dispersion slope equal in magnitude, but opposite in sign.

13. The method of claim 10, wherein the first pigtail fiber and second pigtail are equal in length with a respective dispersion equal in magnitude but opposite in sign.

14. The method of claim 10, wherein the sensing coil comprises a first sensing fiber and a second sensing fiber, wherein the first sensing fiber and second sensing fiber are equal in length, with a respective dispersion equal in magnitude, but opposite in sign.

15. The method of claim 10, wherein the broadband light source exhibits second order coherence such that g11 is substantially equal to two.

16. The method of claim 10, wherein the broadband light source exhibits non-ideal light source statistics, wherein at least one of the first input fiber, second input fiber, first pigtail fiber, second pigtail fiber, or one or more sensing fibers adjusts for the non-ideal light source statistics.

17. A system for a dispersion managed interferometric fiber optic gyroscope comprising:
 a broadband light source configured to provide an input signal;
 a coupler coupled to the broadband light source via a first input fiber, the first input fiber configured to carry the input signal from the broadband light source to the coupler, wherein the coupler has a first coupler output and a second coupler output;
 a rate detector coupled to the second coupler output via an output fiber, the output fiber configured to carry a coupled signal from the second output to the rate detector;
 an integrated optical circuit comprising:
  a beamsplitter that directs the input signal to a first output and a second output;
  a combiner coupled to the first output and the second output, the combiner configured to combine a first return signal from the first output and a second return signal from the second output into a combined return signal;
  an integrated optical circuit input coupled to the first coupler output via a second input fiber, the second input fiber configured to carry the input signal from first coupler output to the integrated optical circuit input and the combined return signal from the integrated optical circuit input to the coupler;
 a first pigtail fiber coupled to the first output;
 a second pigtail fiber coupled to the second output;
 a fiber optic gyroscope sensing coil coupled to the first pigtail fiber and second pigtail fiber, the fiber optic gyroscope sensing coil comprising one or more sensing fibers, wherein the first pigtail fiber carries the input signal to the fiber optic gyroscope sensing coil and the first return signal from fiber optic gyroscope sensing coil to the first output, wherein the second pigtail fiber carries the input signal to the fiber optic gyroscope sensing coil and the second return signal from fiber optic gyroscope sensing coil to the second output;
 wherein at least one dispersion slope of at least one of the first input fiber, second input fiber, first pigtail fiber, second pigtail fiber, and the one or more sensing fibers is selected such that at least one of the input signal or combined return signal at the integrated optical circuit input has a second order coherence g11 substantially equal to two;
 a measurement unit coupled to the dispersion managed interferometric fiber optic gyroscope, the measurement unit configured to read a signal from the rate detector indicative of rotational movement based on the coupled signal; and
 an interface device coupled to the measurement unit configured to indicate a result indicative of the rotational movement of the interferometric fiber optic gyroscope.

18. The system of claim 17, wherein the first input fiber, second input fiber, first pigtail fiber, second pigtail fiber, and the one or more sensing fibers have zero dispersion slope.

19. The system of claim 17, wherein the first input fiber and second input fiber are equal in length with a respective dispersion slope equal in magnitude, but opposite in sign, wherein the first pigtail fiber and second pigtail are equal in length with a respective dispersion equal in magnitude but opposite in sign.

20. The system of claim 17, wherein the total dispersion is zero, wherein total dispersion is a sum of each product of a respective dispersion slope and respective fiber length of the first input fiber, second input fiber, first pigtail fiber, second pigtail fiber, and one or more sensing fibers.

* * * * *